United States Patent

Slavney

[15] 3,645,575
[45] Feb. 29, 1972

[54] RESILIENT BUMPER GUARD FOR MOTOR VEHICLES

[72] Inventor: Coleman M. Slavney, 1618 Jefferson Street, Madison, Wis. 53711

[22] Filed: Jan. 13, 1970

[21] Appl. No.: 2,484

Related U.S. Application Data

[63] Continuation-in-part of Ser. No. 795,980, Feb. 3, 1969, Pat. No. 3,563,595.

[52] U.S. Cl. ................................. 293/67, 61/48, 248/300, 248/345.1, 267/140, 293/71
[51] Int. Cl. ................. B60r 19/06, B60r 19/08, B61f 19/04
[58] Field of Search .................... 61/48; 248/72, 200, 205 R, 248/206 M, 222, 300, 345.1; 267/140; 293/64, 65, 66, 67, 71 R, 71 P, 71

[56] References Cited

UNITED STATES PATENTS

| 3,563,595 | 2/1971  | Slavney      | 293/67      |
| 2,214,513 | 9/1940  | Thorp et al. | 293/65      |
| 2,214,514 | 9/1940  | Walklet      | 293/65      |
|   566,544 | 8/1896  | Smith        | 248/300 X   |
| 1,744,408 | 1/1930  | Millard      | 293/71 R    |
| 1,834,824 | 12/1931 | Brown        | 293/71 P    |
| 1,896,277 | 2/1933  | Barry        | 293/71 R    |
| 2,027,800 | 1/1936  | Whitlock     | 61/48       |
| 2,182,085 | 12/1939 | Kellner et al.| 293/71 R X |
| 2,230,333 | 2/1941  | Painter      | 293/66      |
| 2,350,433 | 6/1944  | Vernon       | 248/300     |
| 2,798,756 | 7/1957  | Corydon      | 293/67      |
| 2,958,555 | 11/1960 | Johnson et al.| 293/71 R X |
| 3,197,189 | 7/1965  | Pemper et al.| 267/140     |

*Primary Examiner*—Arthur L. La Point
*Assistant Examiner*—Howard Beltran
*Attorney*—Donald D. Jeffery

[57] ABSTRACT

A bumper guard assembly for motor vehicles, parking ramps, loading docks, and the like, comprising a channel-shaped mounting bracket and a bumper member. The mounting bracket has spaced V notches in the flanges thereof to facilitate conforming the bracket generally to a desired shape. The bumper member has a baseplate bonded to a resilient element. The baseplate has a substantially longitudinally extending slot and the resilient element has a groove in the rear face thereof communicating with the slot for receiving the head of a mounting bolt for securing the bumper member to the mounting bracket above an attaching lip on the lower end of the mounting bracket.

10 Claims, 7 Drawing Figures

Patented Feb. 29, 1972

INVENTOR.
COLEMAN M. SLAVNEY
BY
Joseph G. Werner
John McWinter
ATTORNEYS

Patented Feb. 29, 1972
3,645,575
3 Sheets-Sheet 2
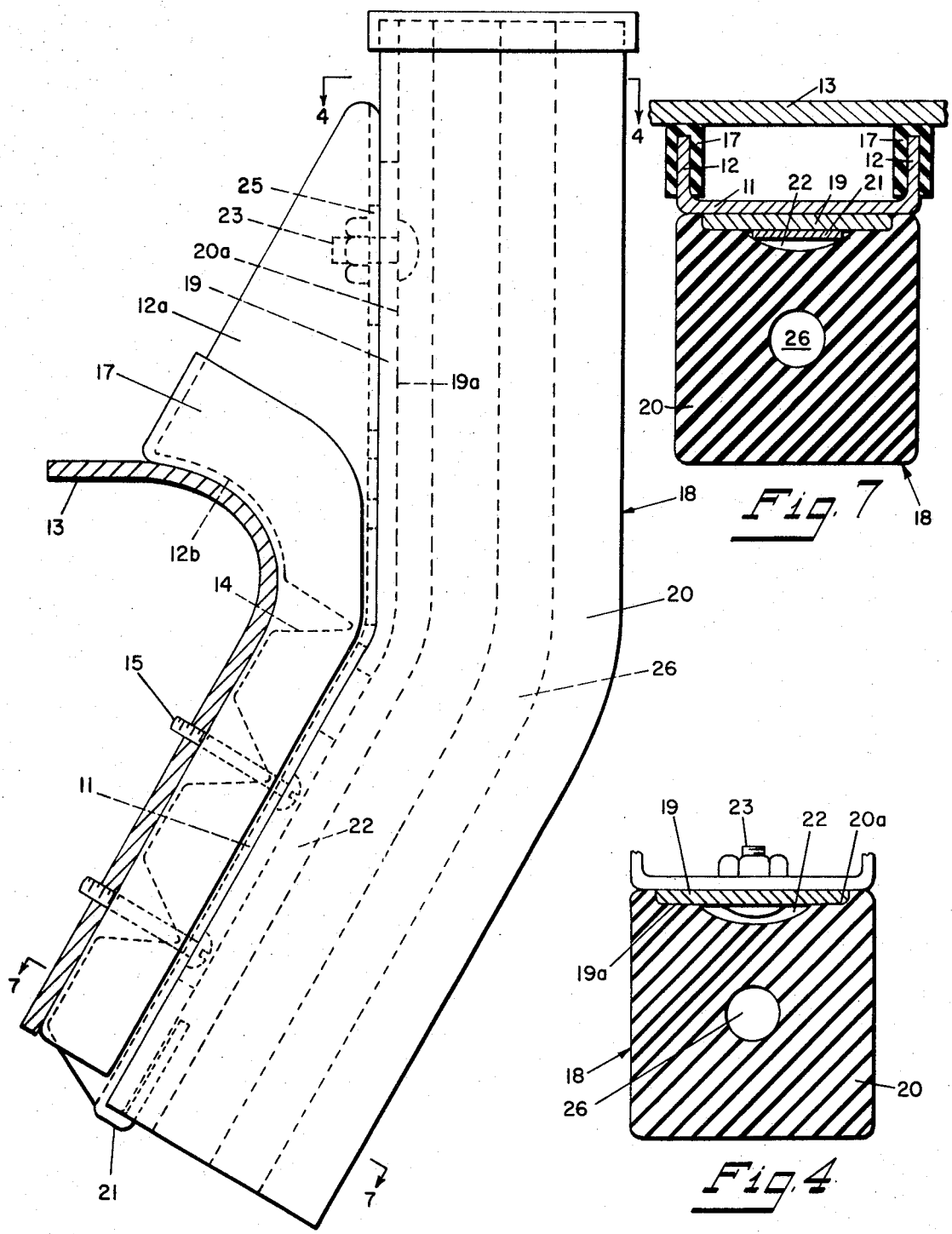
INVENTOR.
COLEMAN M. SLAVNEY
BY Joseph G. Werner
John M. Winter
ATTORNEYS Patented Feb. 29, 1972 3,645,575

INVENTOR.
COLEMAN M. SLAVNEY
BY Joseph G. Werner
John W. Winter
ATTORNEYS

RESILIENT BUMPER GUARD FOR MOTOR VEHICLES

CROSS-REFERENCE TO RELATED APPLICATION

This application is a continuation-in-part of my copending application Ser. No. 795,980, filed Feb. 3, 1969, now U.S. Pat. No. 3,563,595, issued Feb. 16, 1971.

BACKGROUND OF THE INVENTION

1. Field of the Invention

My invention relates to bumper guard assemblies for motor vehicles, parking ramps, loading docks, and the like.

2. Description of the Prior Art

The bumper guards for parking ramps, loading docks and the like typically comprise a 2×8 wooden slab extending across the parking stall or loading area.

Bumpers on automobiles, trucks, buses and other types of motor vehicles are mounted at the front and the rear of the vehicles and extend beyond the body proper by a slight margin so as to allow one vehicle to bump another or be bumped by another without causing damage to the body of either. Unfortunately, the bumpers of present day motor vehicles vary tremendously in size, height and style. These factors generally make the bumpers of the vehicles ineffectual because, instead of meeting each other squarely, they may miss completely or, at best, strike in such a manner that the smooth chrome surfaces of the bumpers slide over or under one another causing substantial damage to the grill, radiator, headlights, taillights and fenders of the vehicles.

Furthermore, because in most instances the bumpers extend only slightly beyond the body portions of the vehicle and in some instances the body portions, grill and lights actually extend beyond the bumper, minor damage, dents, scratches and light breakage frequently result just from normal parking and use of the vehicle. These minor body dents and scratches not only detract from the appearance of a vehicle but, more importantly, are the starting points for deterioration of the body due to rusting.

These problems are all magnified, of course, in vehicles such as pickup and delivery trucks which normally undergo rather rough handling.

While several types of bumper guards have been developed in the past, they have not been entirely satisfactory because they suffered from one or a combination of the following shortcomings: they offered inadequate protection; they could only be used on a very limited number of bumper styles; they were difficult to mount and unsightly when mounted; and they could only be mounted at certain positions on the bumpers and, therefore, were often ineffectual.

SUMMARY OF THE INVENTION

My resilient bumper guard provides a nonslipping, shock-absorbing, protective attachment for motor vehicles, parking ramps, loading docks and the like.

It not only is effective in preventing minor dents and breakage, but in more serious collisions, it absorbs a substantial portion of the initial collision impact, thus greatly reducing the extent of damage and possible personal injury.

The bumper guard assembly comprises a mounting bracket and bumper member. The channel-shaped mounting bracket has at least one V notch in each flange to facilitate bending of the bracket to conform generally to the configuration of the surface to which it will be attached. The bumper member has a baseplate bonded to the rear of a resilient element. The baseplate has a mounting slot communicating with a groove in the rear face of the resilient member for receiving a fastener, which together with an attaching lip on the mounting bracket protruding into the groove secures the bumper member of the assembly to the bracket member.

The unique construction of my bumper assembly permits substantially universal attachment because it can be readily conformed generally to the configuration of a vehicle bumper or other surface to which it is to be mounted.

Further objects, features and advantages of my invention will be apparent from the following detailed description taken in conjunction with the accompanying drawings wherein several embodiments of my invention have been elected for exemplification.

BRIEF DESCRIPTION OF THE DRAWINGS

FIG. 3 is side elevation view, partly in section, of one embodiment of my bumper guard assembly as it can be bent to conform to the shape of a motor vehicle bumper.

FIG. 4 is a cross-sectional view taken along line 4—4 in FIG. 3.

FIG. 7 is a cross-sectional view taken on line 7—7 of FIG. 3.

DESCRIPTION OF PREFERRED EMBODIMENTS

Figures 1, 2:
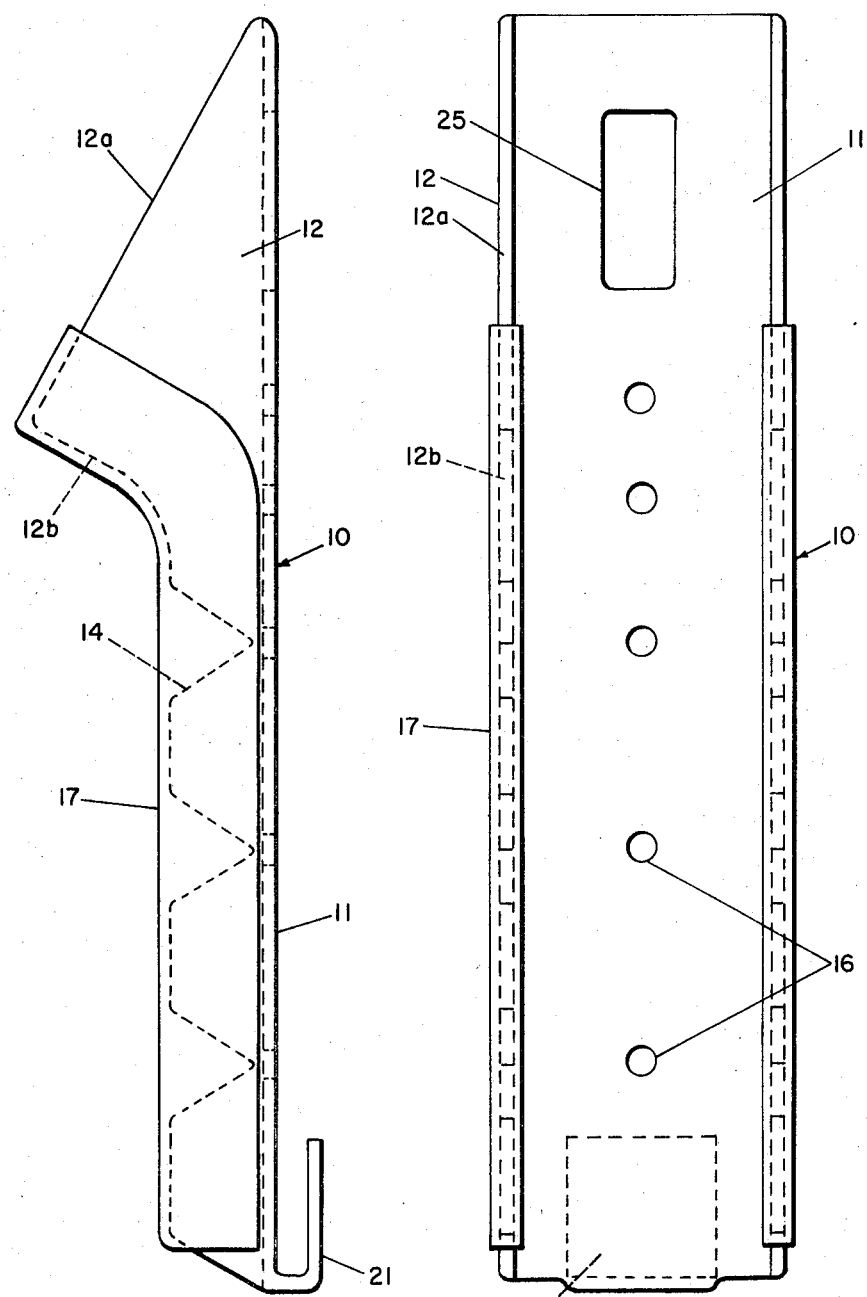
FIG. 1 is a side elevation view of one embodiment of the mounting bracket of my bumper guard assembly.
FIG. 2 is a rear elevation view of the mounting bracket shown in FIG. 1.

Referring now more particularly to the drawings wherein like numerals refer to like parts throughout the several views, one form of the mounting bracket of my bumper guard assembly is shown generally at 10 in FIGS. 1 and 2. As shown therein, the bracket has a web 11 connecting a pair of rearwardly extending side flanges 12 to give the bracket a generally C-shaped cross section. Each of the flanges has a flared upper portion 12a providing a shoulder edge 12b for mounting the bracket on a vehicle bumper 13 as shown in FIG. 3.

As seen in FIGS. 1–3, each of the flanges has a series of vertically spaced V notches 14 formed therein extending forwardly from the rear edge of the side flanges substantially to the web 11. As best shown in FIG. 3, the V notches permit bending of the bracket to conform to the configuration of a vehicle bumper 13 to which the bracket is to be mounted. This unique construction permits portions of the bracket to be bent forwardly or rearwardly to provide for substantially universal attachment to vehicle bumpers of practically any cross-sectional configuration.

The mounting bracket 10 is secured to the vehicle bumper 13, as shown in FIG. 3, by a pair of self-tapping screws 15 extending through holes 16 and threaded into holes drilled in the vehicle bumper.

The rear edge of each side flange is covered with a channel-shaped strip 17 of flexible material, preferably rubber, to prevent metal to metal contact and to cover the V notches so as to present a continuous conformed edge for appearance.

Figure 5:
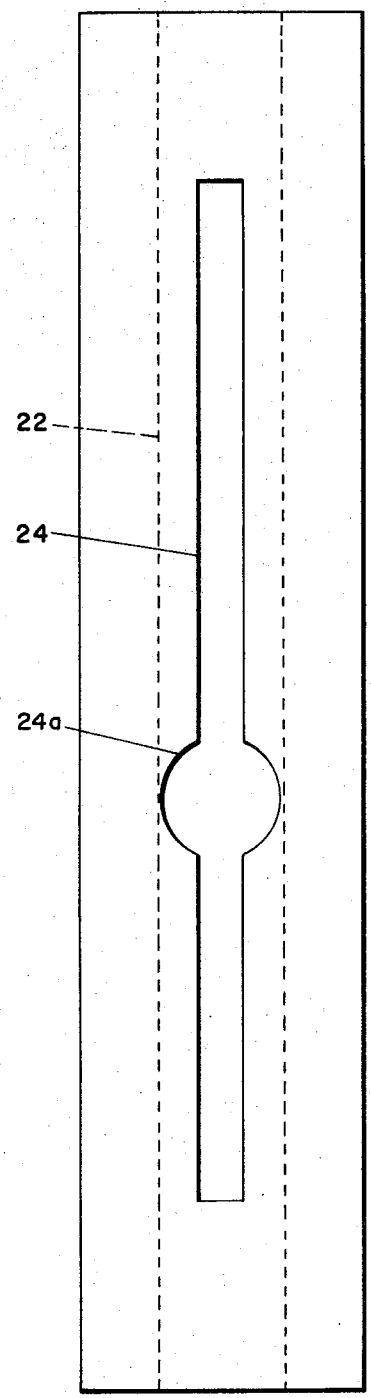
FIG. 5 is a rear elevation view of one embodiment of the bumper member of my bumper guard assembly.

The bumper member, generally shown at 18 in FIGS. 3–5, comprises a metal baseplate 19 having its front face 19a bonded to the rear face 20a of a resilient bumper element 20. The bumper member 18 is provided with a substantially straight baseplate 19 which may then also be bent, as shown in FIG. 3, to conform to the shape of the front of the mounting bracket.

The bumper member 18 is secured to the mounting bracket 10 by inserting an attaching lip 21 which extends outwardly and upwardly from the bottom edge of the mounting bracket into a groove 22 formed in the rear face of the resilient bumper element. The attaching lip 21 thus engages the bottom edge and front face of the baseplate 18 as shown in FIG. 3. The upper end of the bumper member 18 is secured to the web of the mounting bracket by a bolt 23. The head of the bolt is inserted into an enlargement 24a in a mounting slot 24 formed in the baseplate 19 and moved upwardly in the slot to the position shown in FIG. 3, whereby the shank of the bolt extends through the attaching slot and a hole 25 in the upper end of the web of the mounting bracket. The heads of the attaching screws 15 for the mounting bracket are accommodated in the lower portion of slot 24 in the bumper member.

The resilient bumper element 20 is preferably made of rubber or similar material having a durometer hardness of about 50 to 70. The element has an aperture 26 extending longitudinally therethrough to provide increased flexibility without having to sacrifice toughness of the rubber. Aperture 26 thus permits increased indentation of the bumper element when the element is engaged by the bumper of another vehicle thereby providing gripping of the engaging bumper to prevent the engaging bumper from riding over or under the guarded bumper.

Figure 6:
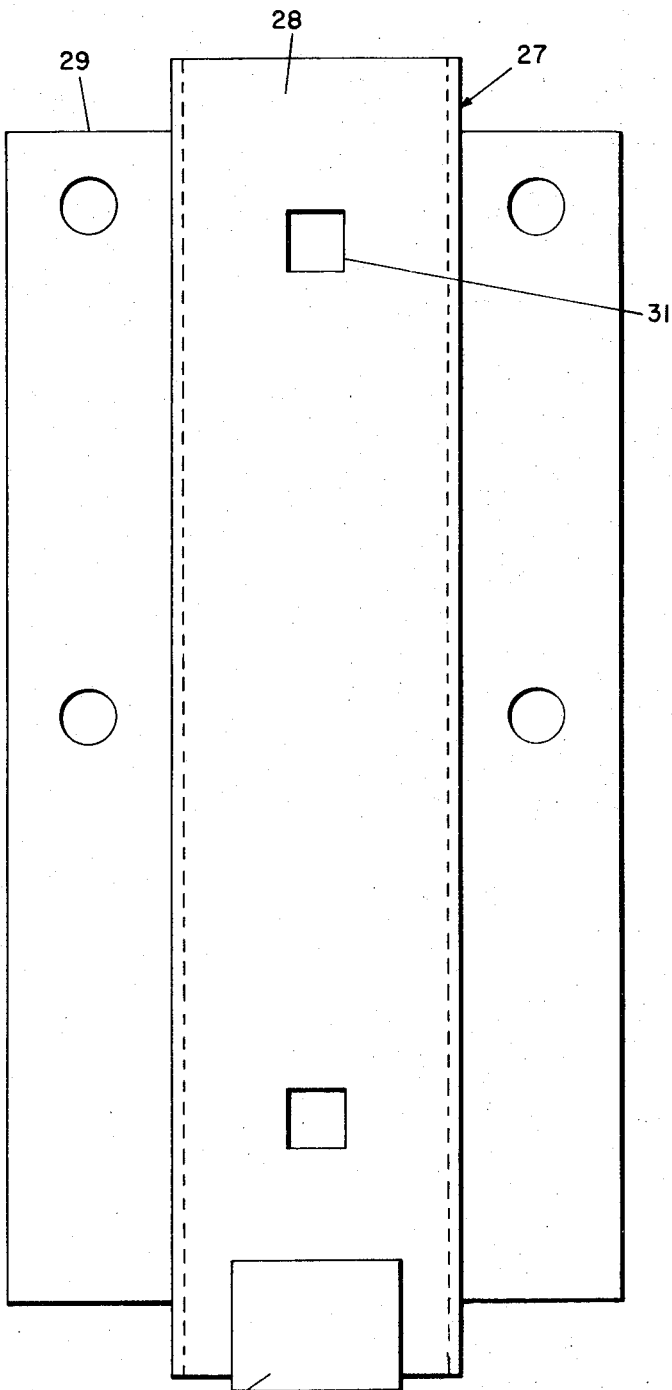
FIG. 6 is a front elevation of a second embodiment of the mounting bracket portion of my bumper guard assembly.

FIG. 6 shows a second form of attaching bracket for attaching the bumper member 18 of my assembly to a flat surface such as a loading dock, parking ramp wall or the like. This mounting bracket 27 has a channel-shaped web 28 with mounting flanges 29, an attaching lip 30, and a hole 31 for receiving a fastening bolt such as 23 shown in FIG. 3.

It is understood that my invention is not confined to the particular construction, arrangement of parts or materials herein illustrated and described, but embraces all such modified forms thereof as come within the scope of the following claims.

I claim:
1. A bumper guard assembly comprising
   a. resilient bumper guard means, said bumper guard means having a generally central axial opening therethrough to enhance the cushioning effect of said bumper guard means upon impact, said bumper guard means being further formed with a longitudinal groove in one face thereof,
   b. mounting bracket adapted to be mounted on a structure to be protected,
   c. means for interengaging one end of said bracket with the corresponding end of said bumper guard means for supporting the latter,
   d. fastener means received in said longitudinal groove of said bumper guard means for securing said bumper guard means to said mounting bracket at a point relatively remote from said interengaging means, said groove permitting vertical adjustment of said bumper guard means relative to said mounting bracket thereby to adapt the assembly to the particular configuration of the structure to be protected, and
   e. said bumper guard means being formed with means for retaining said fastener means in said groove and permitting the desired vertical adjustment of said bumper guard means relative to said mounting bracket.

2. The bumper guard assembly of claim 1 wherein said retaining means for said bumper guard means comprises a rigid baseplate secured to said bumper guard means, said baseplate being formed with a longitudinally extending slot aligned and communicating with said groove formed in said one face of said bumper guard means, at least one portion of said slot being enlarged to receive said fastener means and said groove permitting slidable vertical adjustment of said guard assembly on said bracket.

3. The bumper guard assembly of claim 2 wherein said interengaging means comprises a lip extending upwardly from said web of said mounting bracket and spaced therefrom to define an opening therebetween, said lip extending into said groove of said bumper guard means when the latter is mounted on said bracket.

4. The bumper guard assembly of claim 1 wherein said mounting bracket is generally channel shaped comprising a pair of rearwardly extending flanges and a connecting web, each of said flanges having at least one notch formed therein to facilitate bending of said web to conform to the configuration of the surface on which said bracket is to be mounted.

5. The bumper guard assembly of claim 4 wherein each of said flanges of said mounting bracket is formed with a plurality of spaced notches.

6. The bumper guard assembly of claim 5 further including a channel-shaped strip of flexible material mounted on each of said flanges of said mounting bracket thereby to prevent metal to metal contact when said bumper guard assembly is mounted on a metal surface.

7. The bumper guard assembly of claim 1 wherein said mounting bracket comprises a connecting web section provided with means for receiving said resilient bumper guard means, intermediate flange sections extending rearwardly from said web section, and lateral mounting flange sections extending laterally from and normal to said intermediate flanges for engagement with the surface on which the bumper guard assembly is to be mounted.

8. A bumper guard assembly comprising
   a. a bumper guard of resilient material, said bumper guard having a generally central axial opening therethrough to enhance the cushioning effect of said bumper guard means upon impact and to prevent the object contacting said guard from climbing up or riding down the exposed front surface of said guard, said bumper guard being formed in addition to said opening with a groove in the rear face thereof,
   b. a rigid baseplate secured to said bumper guard at the rear face thereof enclosing said groove, said baseplate being formed with an elongated slot,
   c. a mounting bracket,
   d. support means formed on said bracket for retainably supporting said bumper guard, and
   e. fastener means for securing said bumper guard to said mounting bracket at a point relatively remote from said support means, said fastener means being disposed in said elongated slot in said bare plate thereby to permit vertical adjustment of said bumper guard relative to said mounting bracket.

9. A bumper guard assembly comprising
   a. a bumper guard of resilient material, said bumper guard having a generally longitudinal opening therethrough to enhance the cushioning effect of said bumper guard means upon impact and to prevent the object contacting said guard from climbing up or riding down the exposed front surface of said guard, said bumper guard further including an elongated, exteriorly closed groove adjacent one side thereof,
   b. amounting bracket, said mounting bracket being generally channel shaped comprising a pair of rearwardly extending flanges and a connecting web, each of said flanges being formed with at least one notch to facilitate bending of said webs to conform to the configuration of the surface on which said bracket is to be mounted, and
   c. means extending in said groove for securing said bumper guard to said mounting bracket at points relatively remote from each other.

10. A mounting bracket for an automobile bumper or the like adapted to receive and support a resilient bumper guard, said bracket comprising
   a. a connecting web and a pair of integral flanges extending in the same direction generally perpendicular to said web thereby to form therewith a bracket generally C-shaped in cross section,
   b. said connecting web being formed with a plurality of openings for securing the same to said bumper guard and the automobile bumper,
   c. each of said flanges being formed with a plurality of spaced notches in the edges thereof to permit bending of said flanges to conform to the shape of the surface on which the bracket is to be mounted, and
   d. means integrally formed at the bottom of said connecting web extending in spaced, parallel relation to said web for engaging and supporting such bumper guard.

* * * * *